(12) United States Patent
Konolige et al.

(10) Patent No.: US 9,507,995 B2
(45) Date of Patent: Nov. 29, 2016

(54) COMBINATION OF STEREO AND STRUCTURED-LIGHT PROCESSING

(71) Applicant: Google Inc., Mountain View, CA (US)

(72) Inventors: Kurt Konolige, Mountain View, CA (US); Ethan Rublee, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 28 days.

(21) Appl. No.: 14/584,016

(22) Filed: Dec. 29, 2014

(65) Prior Publication Data

US 2016/0063309 A1 Mar. 3, 2016

Related U.S. Application Data

(60) Provisional application No. 62/043,463, filed on Aug. 29, 2014.

(51) Int. Cl.
*G06K 9/00* (2006.01)
*G06T 7/00* (2006.01)
*G06T 1/00* (2006.01)

(52) U.S. Cl.
CPC ......... *G06K 9/00201* (2013.01); *G06T 1/0014* (2013.01); *G06T 7/0004* (2013.01);
(Continued)

(58) Field of Classification Search
CPC ............ G06K 9/00201; G06T 7/0004; G06T 1/0014; G06T 7/0057; G06T 7/0075; G06T 2207/30108; G06T 2207/10012
USPC ....... 382/154; 345/419–427; 348/42; 356/12
See application file for complete search history.

(56) References Cited

U.S. PATENT DOCUMENTS

| 8,447,098 B1 * | 5/2013 | Cohen | G06K 9/00 382/154 |
|---|---|---|---|
| 2005/0018209 A1 | 1/2005 | Lemelin et al. | |

(Continued)

FOREIGN PATENT DOCUMENTS

| DE | 100 42 723 A1 | 3/2002 |
|---|---|---|
| DE | 10 2010 036 852 A1 | 2/2012 |

(Continued)

OTHER PUBLICATIONS

International Search Report from corresponding International Patent Application No. PCT/US2015/036404, mailed Oct. 15, 2015.

(Continued)

*Primary Examiner* — Samir Ahmed
(74) *Attorney, Agent, or Firm* — McDonnell Boehnen Hulbert & Berghoff LLP

(57) ABSTRACT

Methods and systems for determining depth information using a combination of stereo and structured-light processing are provided. An example method involves receiving a plurality of images captured with at least two optical sensors, and determining a first depth estimate for at least one surface based on corresponding features between a first image and a second image. Further, the method involves causing a texture projector to project a known texture pattern, and determining, based on the first depth estimate, at least one region of at least one image of the plurality of images within which to search for a particular portion of the known texture pattern. And the method involves determining points corresponding to the particular portion of the known texture pattern within the at least one region, and determining a second depth estimate for the at least one surface based on the determined points corresponding to the known texture pattern.

20 Claims, 12 Drawing Sheets

(52) U.S. Cl.
CPC ........... *G06T 7/0057* (2013.01); *G06T 7/0075* (2013.01); *G06T 2207/10012* (2013.01); *G06T 2207/30108* (2013.01)

(56) References Cited

U.S. PATENT DOCUMENTS

| | | | |
|---|---|---|---|
| 2005/0100207 A1* | 5/2005 | Konolige | G06T 7/0071 |
| | | | 382/154 |
| 2006/0221072 A1* | 10/2006 | Se | G01C 11/06 |
| | | | 345/420 |
| 2007/0285672 A1* | 12/2007 | Mukai | G01B 11/2518 |
| | | | 356/603 |
| 2010/0141757 A1* | 6/2010 | Baik | G06T 7/0077 |
| | | | 348/135 |
| 2010/0315490 A1 | 12/2010 | Kim et al. | |
| 2012/0056982 A1 | 3/2012 | Katz et al. | |
| 2012/0159290 A1* | 6/2012 | Pulsipher | G06K 9/00369 |
| | | | 714/819 |
| 2013/0100114 A1* | 4/2013 | Lynch | G01C 21/3638 |
| | | | 345/419 |
| 2013/0100256 A1* | 4/2013 | Kirk | G06T 7/0057 |
| | | | 348/48 |
| 2013/0242058 A1* | 9/2013 | Bae | H04N 13/0271 |
| | | | 348/47 |
| 2013/0293700 A1* | 11/2013 | Yang | G01B 11/22 |
| | | | 348/135 |
| 2013/0301907 A1* | 11/2013 | Shim | G06K 9/00201 |
| | | | 382/154 |
| 2014/0092281 A1 | 4/2014 | Nisenzon et al. | |
| 2014/0132721 A1 | 5/2014 | Martinez Bauza et al. | |
| 2014/0153783 A1 | 6/2014 | Tao et al. | |
| 2014/0184751 A1 | 7/2014 | Liou et al. | |
| 2014/0307953 A1* | 10/2014 | Kirk | H04N 5/33 |
| | | | 382/154 |

FOREIGN PATENT DOCUMENTS

| | | |
|---|---|---|
| DE | 20 2012 102 541 U1 | 10/2013 |
| WO | 2006/084385 A1 | 8/2006 |

OTHER PUBLICATIONS

Written Opinion from corresponding International Patent Application No. PCT/US2015/036404, mailed Oct. 15, 2015.

* cited by examiner

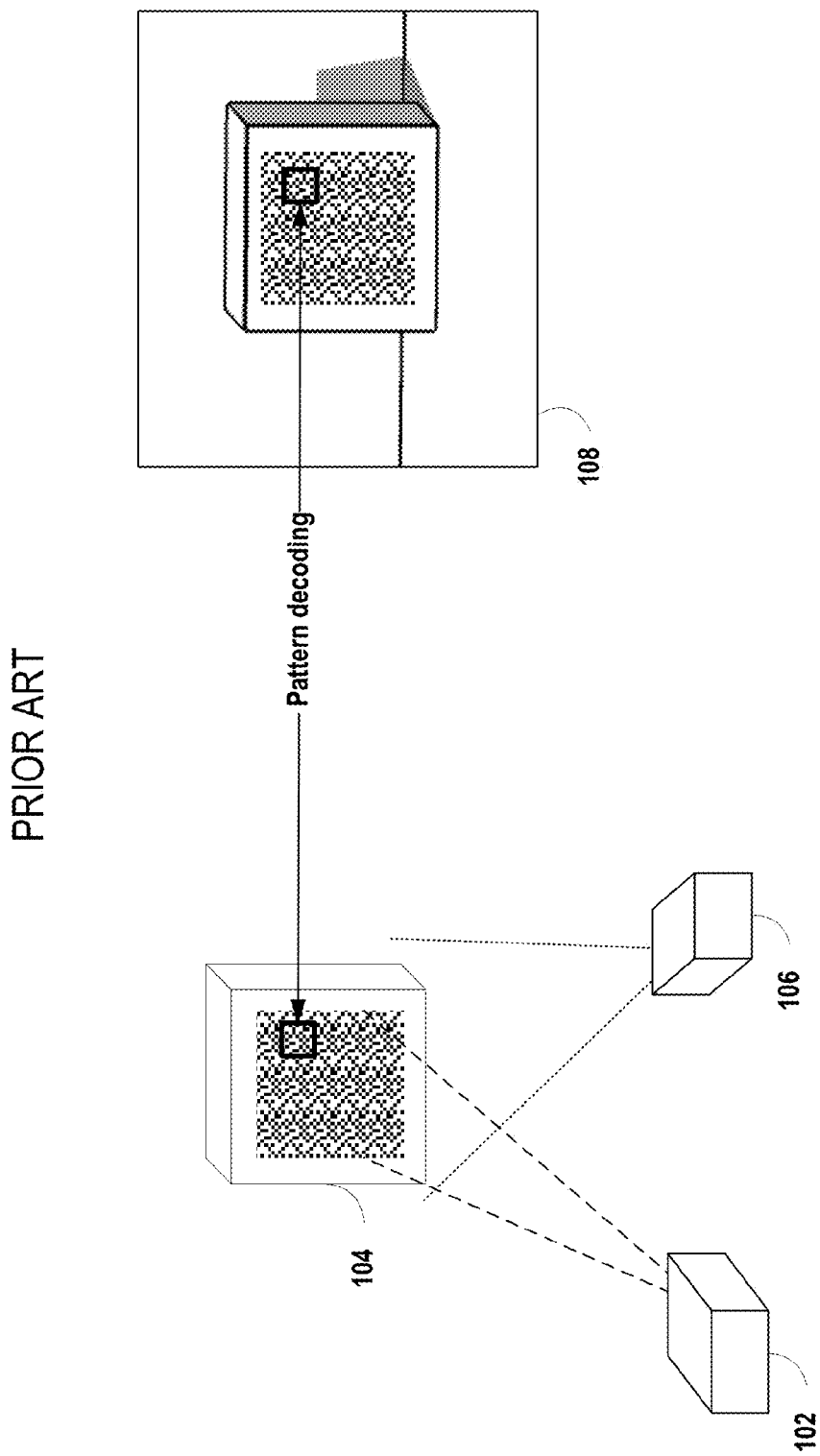

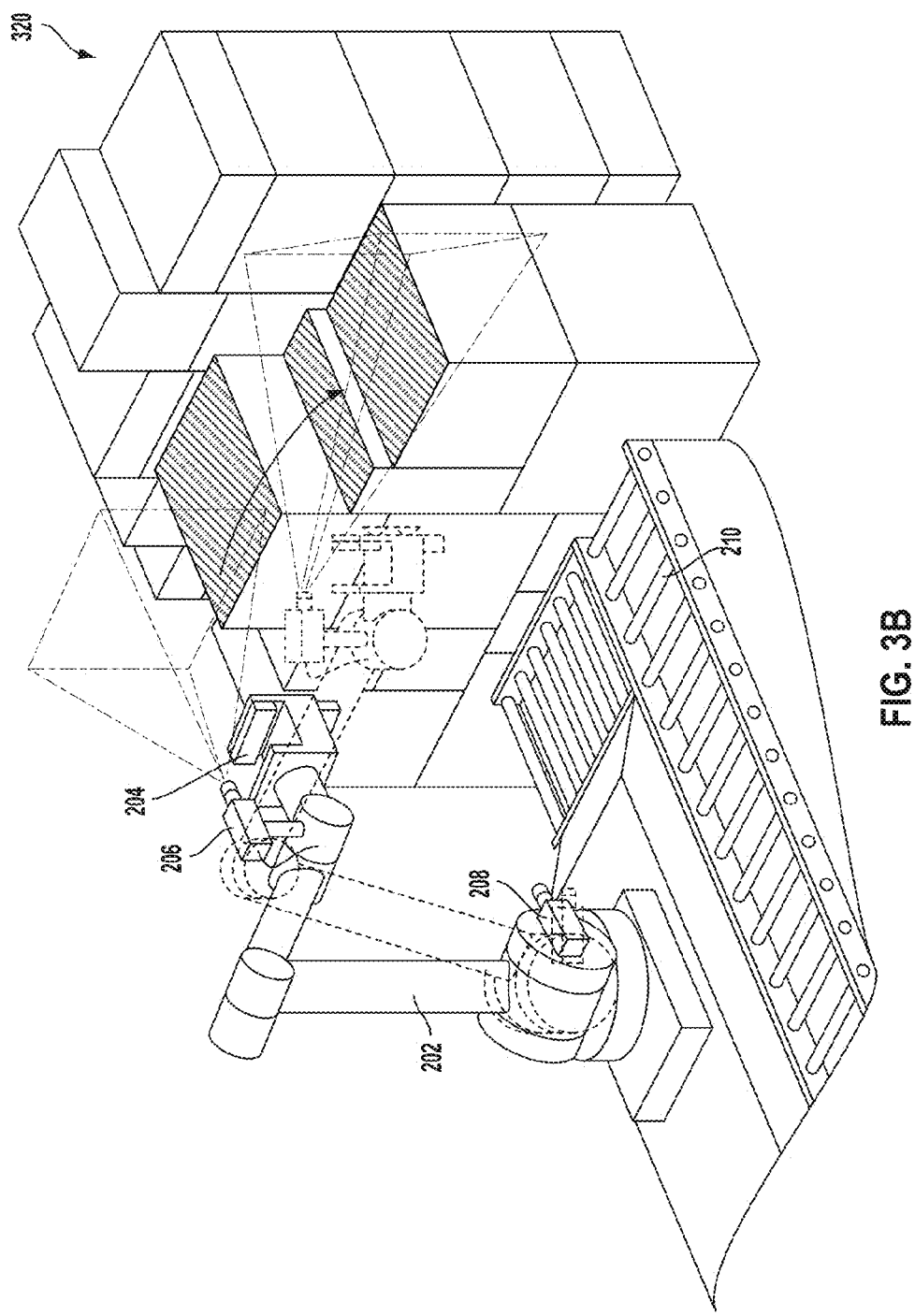

COMBINATION OF STEREO AND STRUCTURED-LIGHT PROCESSING

CROSS-REFERENCE TO RELATED APPLICATIONS

This application claims the benefit of U.S. Provisional Application No. 62/043,463 filed on Aug. 29, 2014, the entirety of which is herein incorporated by reference.

BACKGROUND

Robotic systems, such as a robotic manipulator containing a gripping component, may be used for applications involving picking up or moving objects. For instance, a robotic device may be used to fill a container with objects, create a stack of objects, or unload objects from a truck bed. In some cases, all of the objects may be of the same type. In other cases, a container or truck may contain a mix of different types of objects, such as boxed items, cans, tires, or other stackable objects. Such robotic systems may direct a robotic manipulator to pick up objects based on predetermined knowledge of where objects are in the environment.

In some examples, a robotic system may use computer vision techniques to determine a representation of three-dimensional (3D) scene geometry. By way of example, a robotic system may triangulate information observed from a scene to determine a depth to one or more surfaces in a scene. One approach to depth sensing is the use of stereo image processing. According to this approach, two optical sensors with a known physical relationship to one another are used to capture two images of a scene. By finding mappings of corresponding pixel values within the two images and calculating how far apart these common areas reside in pixel space, a computing device can determine a depth map or image using triangulation. The depth map or depth image may contain information relating to the distances of surfaces of objects in the scene.

Another approach to depth sensing is structured-light processing. The main idea of structured-light processing is to project a known illumination pattern onto a scene, and capture an image of the scene that includes the projected pattern. For example, as shown in FIG. 1, a projector 102 may project a known texture pattern onto an object 104, and an optical sensor 106 (e.g., a camera) may capture an image 108 of the object 104. A computing device may then determine a correspondence between a region in the image and a particular part of the projected pattern. Given a position of the projector 102, a position of the optical sensor 106, and the location of the region corresponding to the particular part of the pattern within the image 108, the computing device may then use triangulation to estimate a depth to a surface of the object 104.

Typically the projector 102 and optical sensor 106 are displaced horizontally along a baseline, and the projector 102 and optical sensor 106 are calibrated. The calibration process may map a pixel in the optical sensor 106 to a one-dimensional curve of pixels in the projector 102. If the sensor image and the projector image are rectified, then this curve may take the form of a horizontal line. In this case, the search for matches to the projected texture pattern can proceed along this line, making the process more efficient.

In structured-light processing, the process of matching an image region with its corresponding part of the projected part is known as pattern decoding. During pattern decoding, a computing device searches horizontally for a region in the image that contains a unique portion of the projected pattern. In practice, the size of the horizontal region in the image that computing device searches within (i.e., the search space) may require that the pattern be unique over that distance, for every part of the image. For instance, the projected pattern may be made up of repeating portions such that the pattern is unique for a certain size patch (e.g., 19×19 pixels) over a certain horizontal matching range, such as 128 pixels. Consequently, the search space may be a region that is at least 128 pixels.

SUMMARY

In structured-light processing, pattern decoding can be made easier if a computing device does not have to search an entire image, or an entire linear region, for an area corresponding to a particular part of a projected pattern. As described herein, a computing device may use stereo imaging results to restrict the search space for detecting a structured-light pattern in an image. For example, a computing device may use images captured with two optical sensors, that together function as a stereo imaging system, to determine an initial depth estimate for a surface in a scene. The computing device may then use the initial depth estimate to restrict the linear search to a small portion around the depth estimate. Further, the computing device may then use structured-light processing to determine another depth estimate for the surface. Advantageously, prior to performing pattern decoding, the computing device may determine, based on the initial depth estimate, a region of an image of a projected pattern within which to search for a particular portion of the texture pattern. In some examples, using a stereo depth estimate to restrict the search space for pattern decoding may allow the computing device to use texture patterns that are unique over a smaller linear region, thereby increasing the spatial resolution of the resulting depth estimate.

In one example, a method is provided that may involve receiving, by a computing device, a plurality of images captured with at least two optical sensors. The plurality of images may include a first image of an environment as perceived from a first viewpoint of a first optical sensor and a second image of the environment as perceived from a second viewpoint of a second optical sensor. The method may further involve determining, by the computing device, a first depth estimate for at least one surface in the environment based on corresponding features between the first image and the second image. Further, the method may involve causing, by the computing device, a texture projector to project a known texture pattern onto the environment. Additionally, the method may involve determining, by the computing device and based on the first depth estimate, at least one region of at least one image of the plurality of images within which to search for a particular portion of the known texture pattern. The method may also involve determining, by the computing device, points corresponding to the particular portion of the known texture pattern within the at least one region of the at least one image. And the method may involve determining, by the computing device, a second depth estimate for the at least one surface in the environment based on the determined points corresponding to the particular portion of the known texture pattern within the at least one region of the at least one image.

In another example, a non-transitory computer readable medium having stored therein instructions, that when executed by one or more processors of a computing device, cause the computing device to perform functions is disclosed. The functions may include receiving a plurality of images captured with at least two optical sensors. The plurality of images may include a first image of an environment as perceived from a first viewpoint of a first optical sensor and a second image of the environment as perceived from a second viewpoint of a second optical sensor. The functions may further include determining a first depth estimate for at least one surface in the environment based on corresponding features between the first image and the second image. The functions may also include causing a texture projector to project a known texture pattern onto the environment. Furthermore, the functions may include determining, based on the first depth estimate, at least one region of at least one image of the plurality of images within which to search for a particular portion of the known texture pattern. The functions may also include determining points corresponding to the particular portion of the known texture pattern within the at least one region of the at least one image. And the functions may include determining a second depth estimate for the at least one surface in the environment based on the determined points corresponding to the particular portion of the known texture pattern within the at least one region of the at least one image.

In still another example, a system that includes at least two optical sensors, a texture projector, and a computing device is provided. The texture projector may be configured to project a known texture pattern onto an environment. The computing device may be configured to receive a plurality of images captured with the at least two optical sensors. The plurality of images may include a first image of an environment as perceived from a first viewpoint of a first optical sensor and a second image of the environment as perceived from a second viewpoint of a second optical sensor. Additionally, the computing device may be configured to determine a first depth estimate for at least one surface in the environment based on corresponding features between the first image and the second image. The computing device may also be configured to cause the texture projector to project the known texture pattern onto the environment. Further, the computing device may be configured to determine, based on the first depth estimate, at least one region of at least one image of the plurality of images within which to search for a particular portion of the known texture pattern. The computing device may further be configured to determine points corresponding to the particular portion of the known texture pattern within the at least one region of the at least one image. And the computing device may be configured to determine a second depth estimate for the at least one surface in the environment based on the determined points corresponding to the particular portion of the known texture pattern within the at least one region of the at least one image.

In still another example, a system is provided that includes means for receiving a plurality of images captured with at least two optical sensors. The plurality of images may include a first image of an environment as perceived from a first viewpoint of a first optical sensor and a second image of the environment as perceived from a second viewpoint of a second optical sensor. The system may also include means for determining a first depth estimate for at least one surface in the environment based on corresponding features between the first image and the second image. The system may further include means for causing a texture projector to project a known texture pattern onto the environment. Additionally, the system may include means for determining, based on the first depth estimate, at least one region of at least one image of the plurality of images within which to search for a particular portion of the known texture pattern. Furthermore, the system may include means for determining points corresponding to the particular portion of the known texture pattern within the at least one region of the at least one image. And the system may include means for determining a second depth estimate for the at least one surface in the environment based on the determined points corresponding to the particular portion of the known texture pattern within the at least one region of the at least one image.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIG. 1 is a conceptual illustration of an example approach for structured-light processing.

FIG. 3B shows scanning of the stack of boxes from FIG. 3A by a sensor mounted on the robotic arm, according to an example embodiment.

DETAILED DESCRIPTION

Figure 2A:
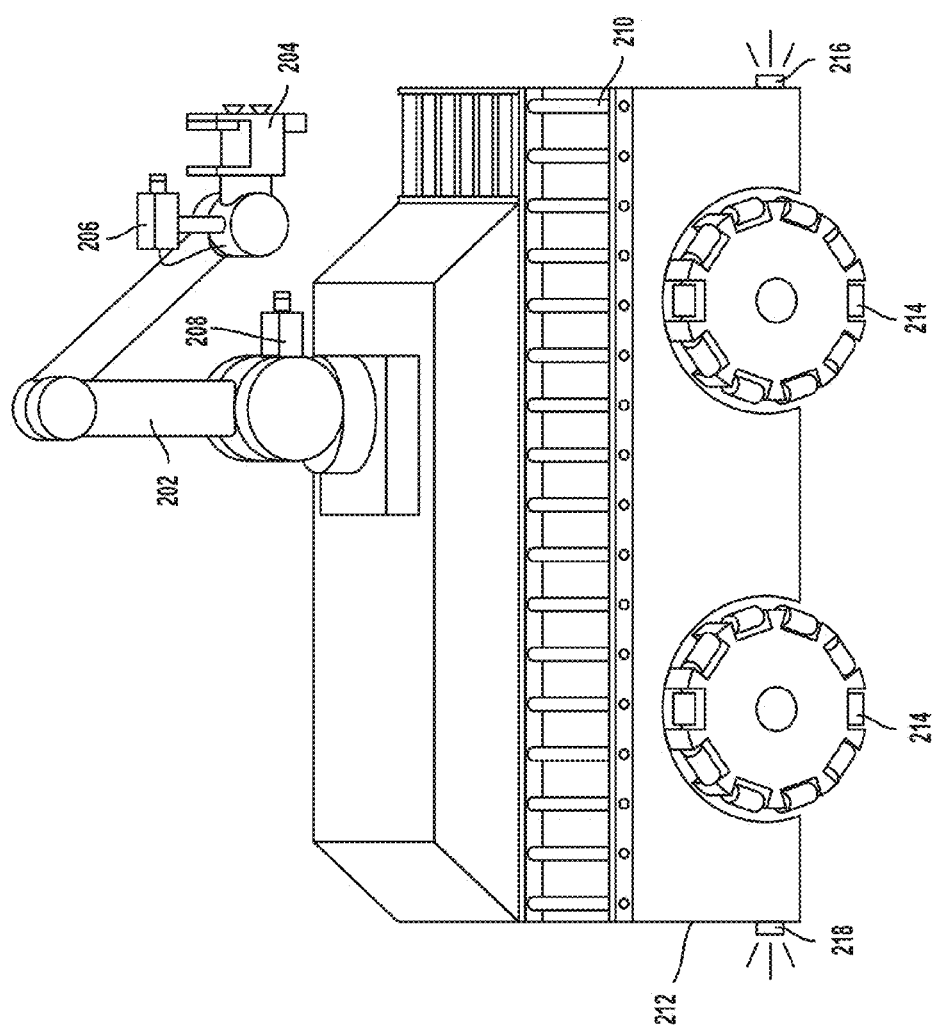
FIG. 2A shows a robotic arm mounted on a moveable cart, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

Methods and apparatuses that may help to improve resolution of 3D scene geometry are provided herein. According to various embodiments, a computing device may use stereo imaging results to restrict the search space for detecting a portion of a structured-light pattern in an image. In one example, a computing device may receive a plurality of images captured with at least two optical sensors. For instance, the plurality of images may include a first image captured from a first viewpoint of a first optical sensor as well as a second image captured from a second viewpoint of a second optical sensor. The computing device may then determine a first depth estimate for at least one surface in the environment based on corresponding features between the first image and the second image. By way of example, the computing device may determine mappings of corresponding pixel values within the two images, and based on a physical relationship between the two optical sensors, the computing device can determine a depth map using triangulation.

Further, the computing device may then use the first depth estimate as an input to a structured-light process. As an example, the computing device may cause a texture projector to project a known texture pattern onto an environment, and receive at least one image of the environment and the known texture pattern. The computing device may also determine, based on the first depth estimate, a region of the image within which to search for a particular portion of the known texture pattern. In other words, rather than performing pattern decoding on the entire image, the computing device may use the first depth estimate to determine a region of the image that is most likely to include a particular portion of the known texture pattern. As described herein, the computing device may determine the region based on the first depth estimate and a physical relationship between the texture projector and an optical sensor used to capture the image. Subsequently, the computing device may determine points corresponding to the particular portion of the known texture pattern within the region, and use the determined corresponding points to calculate a second depth estimate.

As further described below, multiple variations on the example method are contemplated. For instance, in some examples, the known texture pattern may be projected before the images used for stereo imaging are captured. Furthermore, the at least one image used for structured-light processing may include one or more of the images used for stereo image processing, or alternatively, may include one or more images captured using a third optical sensor. Additionally, in some examples, searching for structured-light patterns in two (or more) images captured with two different optical sensors can improve the accuracy and resolution of a depth estimate determined using structured-light processing. Still further, in some examples, a computing device may determine a third depth estimate that combines the first depth estimate (stereo depth estimate) and the second depth estimate (structured-light estimate).

In some examples, using a stereo depth estimate to restrict the search space for pattern decoding may allow the computing device to use texture patterns that are unique over a smaller area, thereby increasing the spatial resolution of the resulting depth estimate. By way of example, in one implementation, a block of a pattern (e.g., a 19×19 pixel block) may be matched across a horizontal region of a sensor (e.g., 128 different pixel positions) to determine if there is a match. The position of the match may indicate the associated depth of the projected pattern patch. Accordingly, it is desirable that the pixel block be unique and highly dissimilar to any other block within any horizontal region of the pattern that is as long as the matching region. As the matching region gets longer, the size of the pixel block is often increased to ensure uniqueness and dissimilarity. Consequently, decreasing the matching region allows for smaller matching blocks, better rejection of false positives, and better spatial resolution of the computed depth. Thus, the described methods and systems may help improve structured-light depth estimates in terms of both quality and spatial resolution.

Various additional examples are described below, therefore the above examples are not meant to be limiting. Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

Additionally, although portions of this disclosure refer to implementing the described methods and apparatuses to facilitate manipulation (e.g., loading and/or unloading) of boxes and/or other objects, the methods and apparatuses may be implemented in other environments as well. For instance, the methods and apparatuses may be implemented generally in any environment to determine the 3D geometry of the environment or 3D geometry of objects in the environment. By way of example, the methods and apparatuses may be implemented to help determine the 3D geometry of a room in a house or an office in building, or perhaps the 3D geometry of a portion of an arena, conference center, or shopping mall. Similarly, the methods and apparatuses may be utilized in outdoor environments as well.

According to various embodiments, described herein are methods and systems for automated loading and/or unloading of boxes and/or other objects, such as into a storage container or from a vehicle. In some example embodiments, boxes or objects may be automatically organized and placed onto pallets (palletized) or automatically removed from pallets (depalletized). Within examples, automating the process of loading/unloading trucks and/or the process of palletizing/depalletizing objects may provide a number of industrial and business advantages.

According to various embodiments, automating the process of loading/unloading trucks and/or the process of palletizing/un-palletizing objects may include the incorporation of one or more robotic devices to move objects or perform other functions. In some embodiments, a robotic device can be made mobile by coupling the robotic device with a wheeled base, a holonomic base (e.g., a base that can move in any direction), or rails on the ceiling, walls or floors. In some embodiments, the base can be an elevated base.

In some examples, a system including one or more sensors, one or more computers, and one or more robotic arms is described. The sensors may scan an environment containing one or more objects in order to capture visual data and/or 3D depth information. Data from the scans may then be integrated into a representation of larger areas in order to provide digital environment reconstruction. In additional examples, the reconstructed environment may then be used for identifying objects to pick up, determining pick positions for objects, and/or planning collision-free trajectories for the one or more robotic arms and/or a mobile base.

As used herein, the term "boxes" will refer to any object or item that can be placed onto a pallet or loaded onto or unloaded from a truck or container. For example, in addition to rectangular solids, "boxes" can refer to cans, drums, tires or any other "simple" shaped geometric items. Additionally, "loading" and "unloading" can each be used to imply the other. For example, if an example describes a method for loading a truck, it is to be understood that substantially the same method can also be used for unloading the truck as well. As used herein, "palletizing" refers to loading boxes onto a pallet and stacking or arranging the boxes in a way such that the boxes on the pallet can be stored or transported on the pallet while the term "depalletizing" refers to removing boxes from a pallet. In addition, the terms "palletizing" and "depalletizing" can each be used to imply the other.

According to various embodiments, a robotic manipulator may be mounted on a holonomic cart (e.g., a cart with wheels that allow the cart to move in any direction). FIG. 2A depicts an exemplary holonomic cart containing a robotic manipulator. In some embodiments, a moveable cart 212 may include a robotic arm 202 mounted on the cart 212. The robotic arm 202 may contain a gripping component 204 for gripping objects within the environment. The cart may contain one or more wheels 214, which may be holonomic wheels that operate with two degrees of freedom. In further embodiments, a wraparound front conveyor belt 210 may be included on the holonomic cart 212. In some examples, the wraparound front conveyer belt 210 may allow the robot to not have to rotate its gripper to the left or right when unloading or loading boxes from or to a truck container or pallet.

In other examples, the robotic manipulator may be mounted on a different type of movable apparatus or may not be mounted on a movable base at all. For example, the robotic manipulator may be mounted at a fixed position within a factory setting. In other example embodiments, one or more robotic manipulators may be mounted on rails of a truck or container. In such examples, the robotic manipulators may be used to load or unload the truck or container.

Figure 2B:
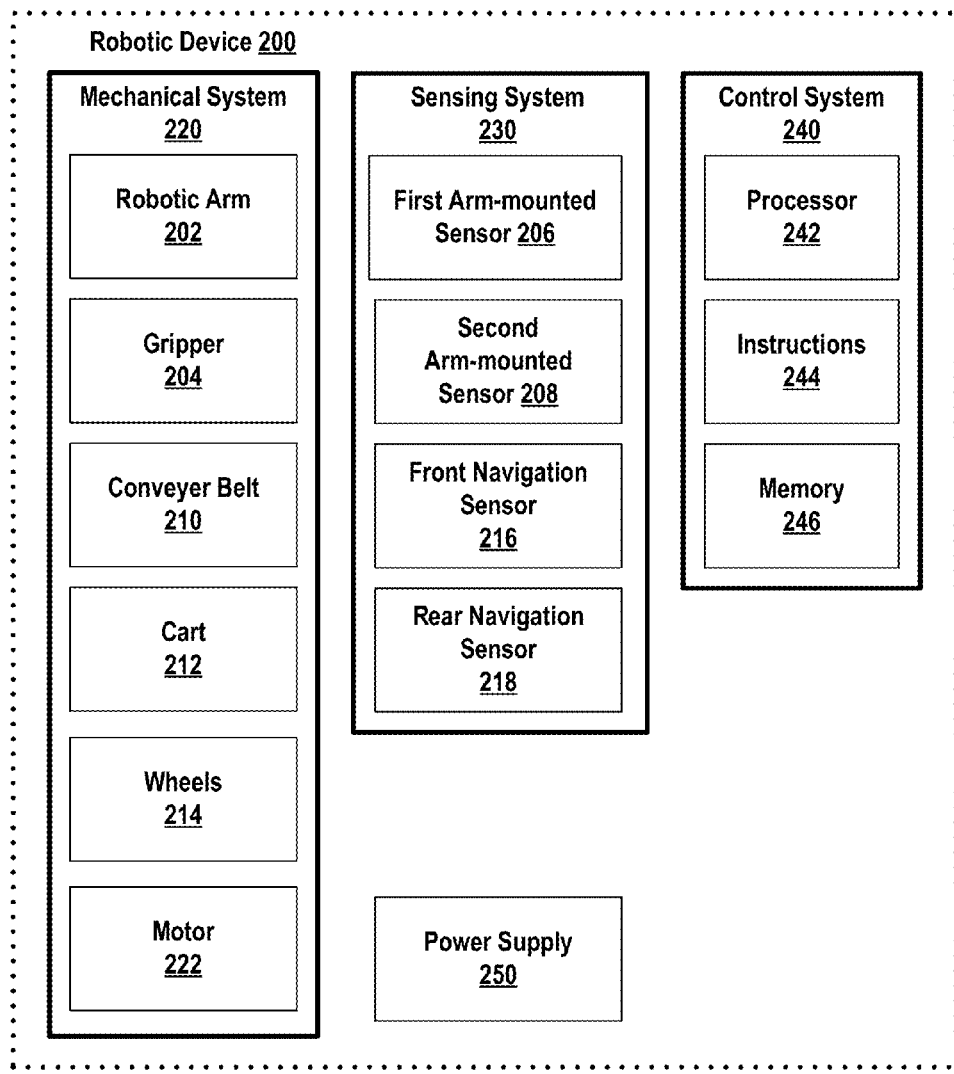
FIG. 2B is a functional block diagram illustrating a robotic device, according to an example embodiment.

FIG. 2B is a functional block diagram illustrating a robotic device 200, according to an example embodiment. The robotic device 200 could include various subsystems such as a mechanical system 220, a sensing system 230, a control system 240, as well as a power supply 250. The robotic device 200 may include more or fewer subsystems and each subsystem could include multiple elements. Further, each of the subsystems and elements of robotic device 200 could be interconnected. Thus, one or more of the described functions of the robotic device 200 may be divided up into additional functional or physical components, or combined into fewer functional or physical components. In some examples, additional functional and/or physical components may be added to the examples illustrated by FIGS. 2A and 2B.

The mechanical system 220 may include components described above with respect to FIG. 2A, including a robotic arm 202, a gripper 204, a conveyer belt 210, a (movable or holonomic) cart 212, and one or more wheels 214. The mechanical system 220 may additionally include a motor 222, which may be an electric motor powered by electrical power, or may be powered by a number of different energy sources, such as a gas-based fuel or solar power. Additionally, motor 222 may be configured to receive power from power supply 250. The power supply 250 may provide power to various components of robotic device 200 and could represent, for example, a rechargeable lithium-ion or lead-acid battery. In an example embodiment, one or more banks of such batteries could be configured to provide electrical power. Other power supply materials and types are also possible.

The sensing system 230 may use one or more sensors attached to a robotic arm 202, such as sensor 206 and sensor 208, which may be 2D sensors and/or 3D depth sensors that sense information about the environment as the robotic arm 202 moves. The sensing system may determine information about the environment that can be used by control system 240 (e.g., a computer running motion planning software) to pick and move boxes efficiently. The control system 240 could be located on the device or could be in remote communication with the device. In further examples, scans from one or more 2D or 3D sensors mounted on a mobile base, such as a front navigation sensor 216 and a rear navigation sensor 218, and one or more sensors mounted on a robotic arm, such as sensor 206 and sensor 208, may be integrated to build up a digital model of the environment, including the sides, floor, ceiling, and/or front wall of a truck or other container. Using this information, the control system 240 may cause the mobile base to navigate into a position for unloading or loading.

In additional examples, planar surface information may be extracted from 3D sensors to model walls, the floor/ceiling, and/or box faces. After modeling the floor, projecting objects onto the floor plane may enable segmentation of obstacles and/or target objects such as boxes. Floor-plane projection can also be used to model the corrugated sides of a container or truck, which may not be accurately modeled as planes. In further examples, sidewall angles, floor plane roll and pitch, and/or distances from side walls can be used to maneuver a mobile base into a container without collisions. Use of extended 3D information rather than a single line scan may help make the extraction of navigation information robust. For example, the side walls may have a vertical extent that is captured by the 3D sensor. Scanning systems that use a single line of depth information may be slower if they scan vertically and/or less robust because they acquire less information. In additional examples, front plane modeling can determine the distance to a next group of objects to pick in truck unloading.

In further examples, the robotic arm 202 may be equipped with a gripper 204, such as a digital suction grid gripper. In such embodiments, the gripper may include one or more suction valves that can be turned on or off either by remote sensing, or single point distance measurement and/or by detecting whether suction is achieved. In additional examples, the digital suction grid gripper may include an articulated extension. In some embodiments, the potential to actuate suction grippers with rheological fluids or powders may enable extra gripping on objects with high curvatures.

In some embodiments, the gripper could potentially span several boxes or objects and turn on suction for some or all of the covered objects. In some embodiments, the suction or adhesion devices may be a "digital" grid so that the robotic device can turn on any number of the suction devices as will fit boxes sensed for grabbing. In some implementations, the system may notice a seam in the boxes (separation between adjacent boxes) such that suction devices can be activated on both sides of the seam to pick up both boxes at once, thereby doubling the throughput. In some embodiments, the suction devices can sense after a certain amount time whether they can successfully grip a surface, after which they may automatically shut off. In further embodiments, sections of the suction devices can fold down to grasp the top of the boxes. For instance, grippers can initially start at full extension and then conform to the surface being gripped.

In further examples, the robotic arm can implement a wiggle movement to improve a suction grip. In additional embodiments, the robotic arm can wiggle a box side-to-side to help segment the box from its surroundings. In other embodiments, the arm can wiggle upon pick up of the box to avoid jostling other objects. In such embodiments, when trying to adhere to an object in order to pick it up using suction, the robotic arm may employ a wiggle motion in order to make a firm seal against the object. In further examples, the robotic arm may wiggle the object as the robotic arm is picking up the object so that the box can more gently break friction or overlap contact with other items. This may help avoid a situation where pulling the object up too directly or too quickly causes other items to be tossed into the air.

According to various embodiments, cardboard boxes can have concave, convex or otherwise rumpled faces that make it hard for a suction device to adhere to. Thus, wiggling the suction device as the device makes suction contact may enable a more reliable grip on cardboard boxes and other non-planar objects. In further examples, when first grabbing a box, a few center suction devices can be turned on and the arm can wiggle back and forth as it starts to pull the box out. This may break surface adhesion with other boxes and help to start to pull the box out. Once the box is at least partially pulled out, the box may then be segmented from the other boxes more easily. In some embodiments, wiggling while picking up an object in clutter may remove other objects from the picked up object, thereby preventing unwanted pick up of surrounding objects.

According to various embodiments, segmentation of items may be necessary for successful grasping. In some embodiments, a smooth surface patch may belong to two separate objects. In such instances, manipulator interaction with the objects may be used to perturb the scene to better segment the objects from each other. For motion separation, the natural or forced movement of objects on a conveyor, on a slide, moving in a tote, and/or actively jostled within a tote may be tracked by optical flow, parallax, or time delayed views to calculate stereo depth in order to enhance object segmentation.

In other examples, one or more of the sensors used by a sensing system may be a RGBaD (RGB+active Depth) color or monochrome camera registered to a depth sensing device that uses active vision techniques such as projecting a pattern into a scene to enable depth triangulation between the camera or cameras and the known offset pattern projector. This type of sensor data may help enable robust segmentation. According to various embodiments, cues such as barcodes, texture coherence, color, 3D surface properties, or printed text on the surface may also be used to identify an object and/or find its pose in order to know where and/or how to place the object (e.g., fitting the object into a fixture receptacle). In some embodiments, shadow or texture differences may be employed to segment objects as well.

Many or all of the functions of robotic device 200 could be controlled by control system 240. Control system 240 may include at least one processor 242 (which could include at least one microprocessor) that executes instructions 244 stored in a non-transitory computer readable medium, such as the memory 246. The control system 240 may also represent a plurality of computing devices that may serve to control individual components or subsystems of the robotic device 200 in a distributed fashion.

In some embodiments, memory 246 may contain instructions 244 (e.g., program logic) executable by the processor 242 to execute various functions of robotic device 200, including those described above in connection with FIGS. 2A-2B. Memory 246 may contain additional instructions as well, including instructions to transmit data to, receive data from, interact with, and/or control one or more of the mechanical system 220, the sensor system 230, and/or control system 240.

Figure 3A:
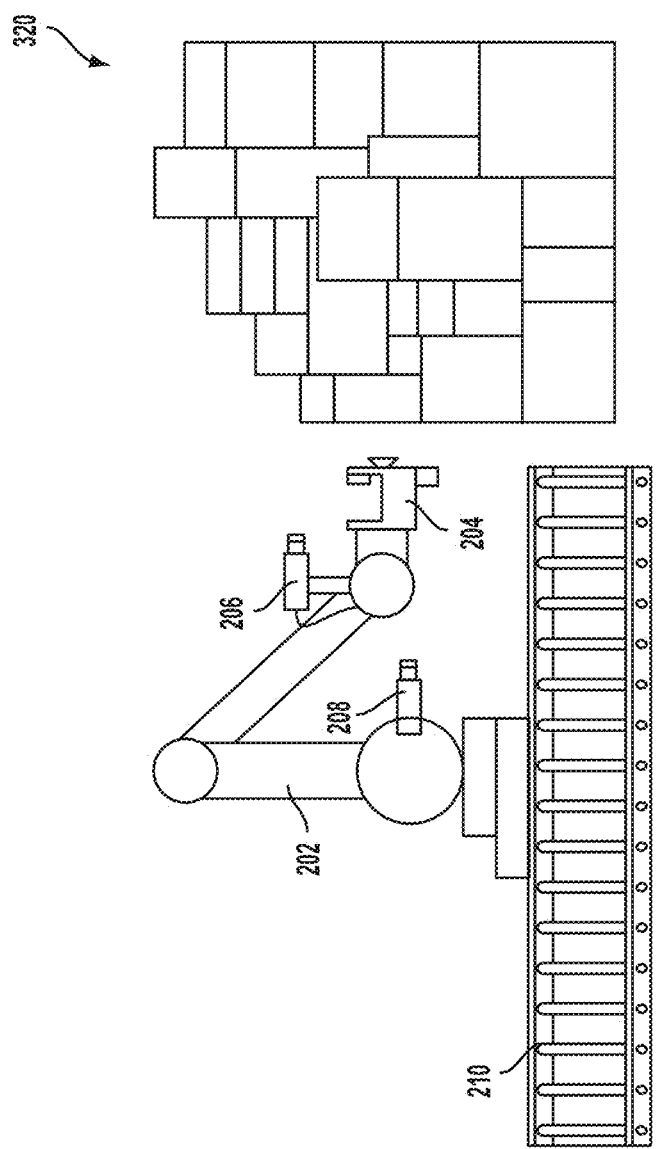
FIG. 3A shows a robotic arm and a stack of boxes, according to an example embodiment.

According to various embodiments, a perception guided robot is described. For instance, a robotic device may utilize a combination of perception together with planning to guide the robot arm to pick up a box and place the box where it needs to go. FIG. 3A illustrates part of the robotic device from FIG. 2A with a stack of boxes, according to an example embodiment. As shown, the robotic device may include a robotic arm 202 with a gripping component 204, sensors 206 and 208, and conveyer 210 as described above. In some examples, the robotic device could be mounted on a holonomic cart as described with respect to FIG. 2A, could be mounted on a different type of movable apparatus, could be mounted on rails or tracks, or could be stationary. The robotic device may be controlled to pick boxes from a stack of boxes 320 containing a heterogeneous mix of shapes and sizes of boxes.

Within examples, a virtual environment including a model of the objects in 2D and/or 3D may be determined and used to develop a plan or strategy for picking up the boxes. In some examples, the robot may use one or more sensors to scan an environment containing objects, as shown in FIG. 3B. As the robotic arm 202 moves, a sensor 206 on the arm may capture sensor data about the stack of boxes 320 in order to determine shapes and/or positions of individual boxes. In additional examples, a larger picture of a 3D environment may be built up by integrating information from individual (e.g., 3D) scans. Sensors performing these scans may be placed in fixed positions, on a robotic arm, and/or in other locations. According to various embodiments, scans may be constructed and used in accordance with any or all of a number of different techniques.

In some examples, scans can be made by moving a robotic arm upon which one or more 3D sensors are mounted. Feedback from the arm position may provide pose information about where the sensor is positioned and may be used to help with the integration. Alternately, or additionally, scans may be made using one or more 2D sensors, for instance by leveraging motion and tracking key-points in the environment. In further examples, scans may be from fixed-mount cameras that have fields of view (FOVs) covering a given field. In additional examples, scans may be visually registered to help with fine pose estimation, potentially giving better integration results.

In further examples, a virtual environment may be built up using a 3D volumetric or surface model to integrate information (e.g., from different sensors). This may allow the system to operate within a larger environment, such as in cases where one sensor may be insufficient to cover a large environment. Such techniques may also increase the level of detail captured, which may help the robotic device perform various tasks. In particular, integrating information can yield finer detail than from a single scan alone (e.g., by bringing down noise levels). This may enable better object detection, surface picking, or other applications.

In further examples, wide-angle environment reconstruction may be performed by sensing an environment and extracting that information into a simplified geometric model of simple mathematical 3D geometric forms (e.g., planes, cylinders, cones, hemispheres, etc.). In some instances, such techniques may make motion planning easier and/or may make violation of the models (e.g., collisions) easier to detect. Alternately, or additionally, such techniques may allow a parametric description to extend the environment. For instance, the ground may be treated as a plane that extends behind objects that occlude it.

In additional examples, planes or other mathematical surfaces in the environment may be extracted in 3D. These known "ideal" surface detections may be combined into a more accurate model of the environment. For instance, planes may be used to determine the full extents of walls (or mathematical description thereof) and other obstacles to avoid collisions and detect the locations of objects of interest. Also, mathematical representations of objects may be used to look for anomalies such as a person entering into an environment. Such events may violate the ideal model, which may make their detection easier.

In other examples, certain objects such as boxes may have simple planar form. For instance, a metal can may have a geometric form of a cylinder and a tire may have a geometric form of a torus. Example systems may leverage this trait of certain objects in order to model them and/or determine how to motion plan for the objects. For instance, known templates of certain shapes can be used to refine detected features of objects within the environment that appear to match a particular shape.

In some examples, 2D and 3D information may be represented at least in part via one or more facades. A facade may be defined as a near-planar construct containing a set of objects, represented as a depth map (e.g., a 2D map with distances as a third dimension). Examples of facades may include a wall of boxes in a truck, a top of a pallet stack containing boxes or other objects, or a top of a bin of jumbled objects.

Figure 3C:
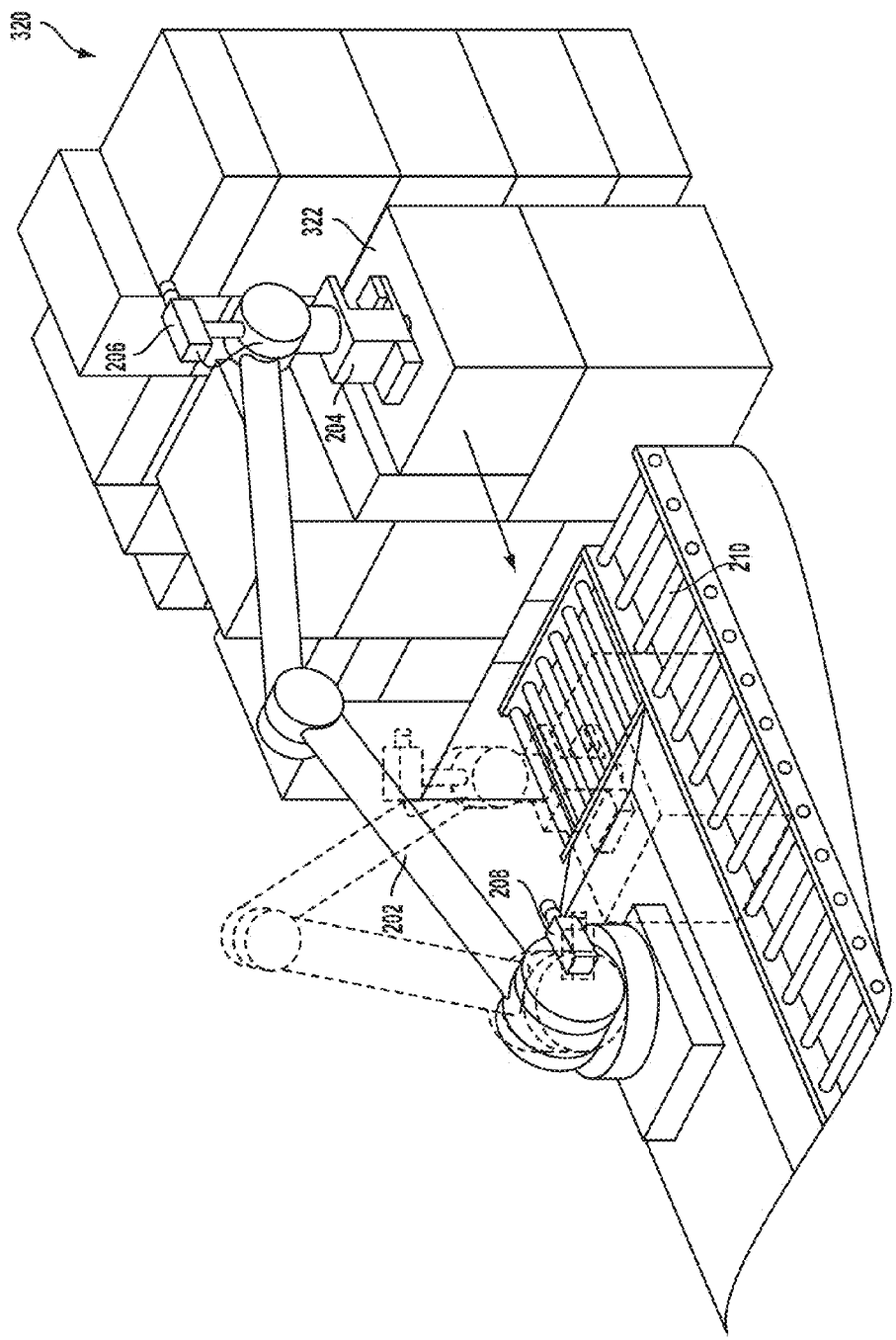
FIG. 3C shows the robotic arm from FIG. 3A moving a box, according to an example embodiment.

In further examples, a facade may be constructed from boxes, for instance to plan an order for picking up the boxes. For instance, as shown in FIG. 3C, box 322 may be identified by the robotic device as the next box to pick up. Box 322 may be identified within a facade representing a front wall of the stack of boxes 320 constructed based on sensor data collected by one or more sensors, such as sensors 206 and 208. A control system may then determine that box 322 is the next box to pick, possibly based on its shape and size, its position on top of the stack of boxes 320, and/or based on characteristics of a target container or location for the boxes. The robotic arm 202 may then be controlled to pick up the box 322 using gripper 204 and place the box 322 onto the conveyer belt 210 (e.g., to transport box 322 into a storage area).

In additional examples, a facade may be represented as an orthographic projection of 3D surface information. This representation may allow for parsing the facade to determine interesting areas for a particular application. For example, in truck unloading, the upper left corner of the next box to pick up may be determined based on a facade representation. In other examples, an orthographic projection of an integrated 3D environment may be determined to give a wide-FOV, easily-parsed representation for performing application-related tasks. One such task may be finding the corner or corners (e.g., top left) of a box to pick. Another such task may involve finding good surfaces (e.g., relatively flat and large) for picking objects out of a bin.

In further examples, a 3D model of a stack of boxes may be constructed and used as a model to help plan and track progress for loading/unloading boxes to/from a stack or pallet. Any one actual camera view of the facade may suffer from point of view occlusions and perspective distortion. Accordingly, multiple RGBD views via robot arm movements and/or different views from a cart base or fixed locations may be combined to create a single facade of the boxes to be picked.

In other examples, the 3D model may be used for collision avoidance. Within examples, planning a collision-free trajectory may involve determining the 3D location of objects and surfaces in the environment. A trajectory optimizer may make use of the 3D information provided by environment reconstruction to optimize paths in the presence of obstacles. In further examples, the optimizer may work in real time and may accept many kinds of constraints. As an example of such a constraint, the optimizer may attempt to keep the end effector level throughout the trajectory.

In additional examples, an environment may be captured as a mesh or set of 3D points. A robot arm may be represented as a convex hull of plane segments for quick collision checking. Constant or frequent updating of the environment may allow the robot arm to quickly respond to changes. In further examples, an optimizer may perform frequent continuous collision checking throughout its path. An optimizer may accept arbitrary constraints in the form of costs, such as to keep a certain distance away from objects or to approach a goal position from a given angle. Additionally, an optimizer may avoid robot fault conditions by working in joint space, keeping track of windup and choosing goal positions from among multiple inverse kinematics solutions. One strategy for motion planning may involve looking ahead several moves to see if the chosen goal joint position will be acceptable for the next move.

In some embodiments, path constraints, such as collision avoidance for robotic arms, cameras, cables, and/or other components, may be put in a constraint based planning solver and solved for to yield a best path to move the arm for perception. Additionally, in some embodiments, the solver may determine a best path for picking up, moving, and placing an object.

According to various embodiments, 3D and/or visual sensors may be calibrated to determine their pose with respect to the workspace. In the case of fixed sensors, the calibration may determine their fixed pose in the workspace. In the case of a sensor on the arm, calibration may determine the offset pose of the sensor from the arm link to which it is attached.

Within examples, calibration techniques may allow for the calibration of an arbitrary number of sensors in the workspace. Calibration may involve determining some or all of a variety of parameters and coefficients. For example, calibration may solve for one or more intrinsic parameters such as focal length and image center. As another example, calibration may determine one or more distortion coefficients such as models of radial and tangential distortion. As yet another example, calibration may solve for one or more extrinsic parameters defining a position of an object in a scene relative to a pattern or other sensors that identified the same pattern in a scene.

In some examples, calibration may be performed at least in part by using a calibration pattern, which may be a known set of features in 2D or 3D. For instance, a known pattern of dots may be used, where the distance between each dot and the other dots is known. Calibration may be performed at least in part by collecting multiple different views of an object. In further examples, capturing multiple views of a calibration pattern in different positions may allow for (1) calibration of the one or more coefficients of the camera and/or (2) knowledge of where the camera is relative to the coordinate system established by where the calibration pattern was fixed. In particular embodiments, a camera in the scene may identify a calibration pattern on the robot arm while a camera on the arm identifies a calibration pattern in the scene simultaneously.

In additional examples, calibration may involve a camera fixed in a scene. In this case, a calibration pattern may be placed on a robotic arm. The robotic arm may be configured to move through the scene as multiple views of the calibration pattern on the robotic arm are collected. This may help to calibrate the camera and/or be useful for relating the coordinate system of the camera to that of the robot. Further, the relation of each device to the other can be determined by each device as the robotic arm moves.

In certain examples, calibration may involve a camera located on a robotic arm. A calibration pattern may be mounted on a wall or table. Then, the camera may be moved around, collecting multiple views of the calibration pattern from different robot or robotic arm positions. When different 3D or 2D views (e.g., 2, 20, or 200) are collected, these views can be used to solve for the calibration relationships. After calibration, when the camera on the arm moves, the system can determine where it is relative to the coordinate system set based on the location of the calibration pattern in the scene. In particular embodiments, both the calibration pattern and the camera may be movable. For example, the calibration pattern may be located on a conveyor belt where the robotic arm may be configured to place boxes. After calibration, the system may determine where the camera was relative to that spot on the conveyor belt.

In further examples, nonlinear optimization may be performed in a two-stage process for robust estimation of 3D sensor calibration. In one stage, an initialization may be derived from the relative pose offsets of the target and the sensors. In another stage, given the initialization, a batch bundle adjustment may be used to find the optimal pose of the cameras together with the target points. Calibration can be extended to the estimation of robot parameters such as joint lengths and joint angle offsets.

In other examples, known, precise, robot motion of the camera over a calibration pattern, or a calibration pattern over a camera may be used to improve calibration results. For instance, information about precisely how the camera moves may be used to obtain more accurate camera calibration. That is, if the camera is moved 50 mm to the right, the corresponding (perspective projection) amount of movement from the calibration object may be detected. This information may be used to jointly or separately optimize the calibration and tracking parameters.

In additional examples, a robot can look at its ongoing calibration and move in such a way as to maximize information for better calibration. For example, it can detect that some view areas have not been seen and go to those views.

In further examples, a system for the practical manipulation of heterogeneous, categorical items, generally from a cluttered collection area to a defined bin, is presented. In some embodiments, the pick location containing the items may not be sensitive to precise object orientation(s) and items may be mixed together. In additional examples, the place location for the items may or may not be sensitive to object orientation. In some examples, the pick-and-place regions may be defined as 3D regions acceptable for picking or placing an object, with some tolerance. The pick-and-place region may be highly cluttered with similar and/or disparate objects. In other embodiments, the items may come from or be put into a fixture, such as metal or plastic snaps that hold the sorted item in a particular orientation.

In additional examples, environment modeling of both the pick-and-place location may be used for intelligent grasp location and motion, as well as event reporting (e.g., when a place region is full or a pick region is empty). In some examples, object bounding volumes may be computed and/ or distinguishing features of objects may be found (such as textures, colors, barcodes or OCR). In some embodiments, objects may be sorted into an assigned destination location by matching against a database of location assignments indexed by object type or object ID. For instance, an object's locations may be derived from reading a barcode, considering the size of the object, and/or by recognizing a particular kind of object.

In some examples, a plan for a robotic device may be determined in order to achieve certain configurations of the objects within a target location for the objects. For instance, the goals for loading/unloading or palletizing/depalletizing may be to achieve: (1) a dense packing with minimal air gaps in between boxes, and/or (2) a stable packing that will not easily collapse. In some embodiments, stability may require that, in general, heavy objects are on the bottom, and light objects are on top. In other examples, pallets may be created in order to avoid non-interlaced column stacks, column leans, or other characteristics of a bad stack.

In further examples, the pallet or truck/container may be loaded such that work by human operators in subsequent unloading processes is minimized. For instance, in some embodiments, items may be placed in last in, first out order such that, upon unpacking, the items needed first are on top, the items needed second are one layer down and so on. In other examples, the loading of pallets may be independent of how items flow towards the packing cells. Thus, according to some embodiments, the system can handle packages sent in random order or in an order known in advance. In addition, in some embodiments, systems may adapt to changes in the flow of items in real-time. In further examples, one or more boxes may be recorded and buffered by holding the boxes in a temporary storage area where their order can be changed along the way.

According to various embodiments, a 2D simulator and/or a 3D simulator may be utilized for truck or container loading/unloading or for pallet loading/unloading. In some examples, the state of a stack of boxes may be captured in the physical world and input into the simulator. In some embodiments, a variable size queue of boxes from one to all the boxes may be used by a simulator for finding a next box to pick. For example, a queue of 2 boxes or 4 boxes or 10 boxes may be considered by a simulator.

In further examples, the simulator may search over the boxes in the queue to find the best box placement by heuristic algorithms and/or by brute force or multi-resolution search. In some embodiments, the system may increment with increasingly fine placement of boxes around the best sites found in the previously coarser level. In some embodiments, once placement of a particular next box has been determined, a physics planner may be used for motion planning in order to move the box efficiently to the determined locations. In further examples, the physical and simulated stacks may be continuously monitored for quality of the stack (e.g., density, stability, and/or order placement). In some examples, the process may be repeated until all the boxes have been placed or the target container can no longer fit in another box.

Figure 4:
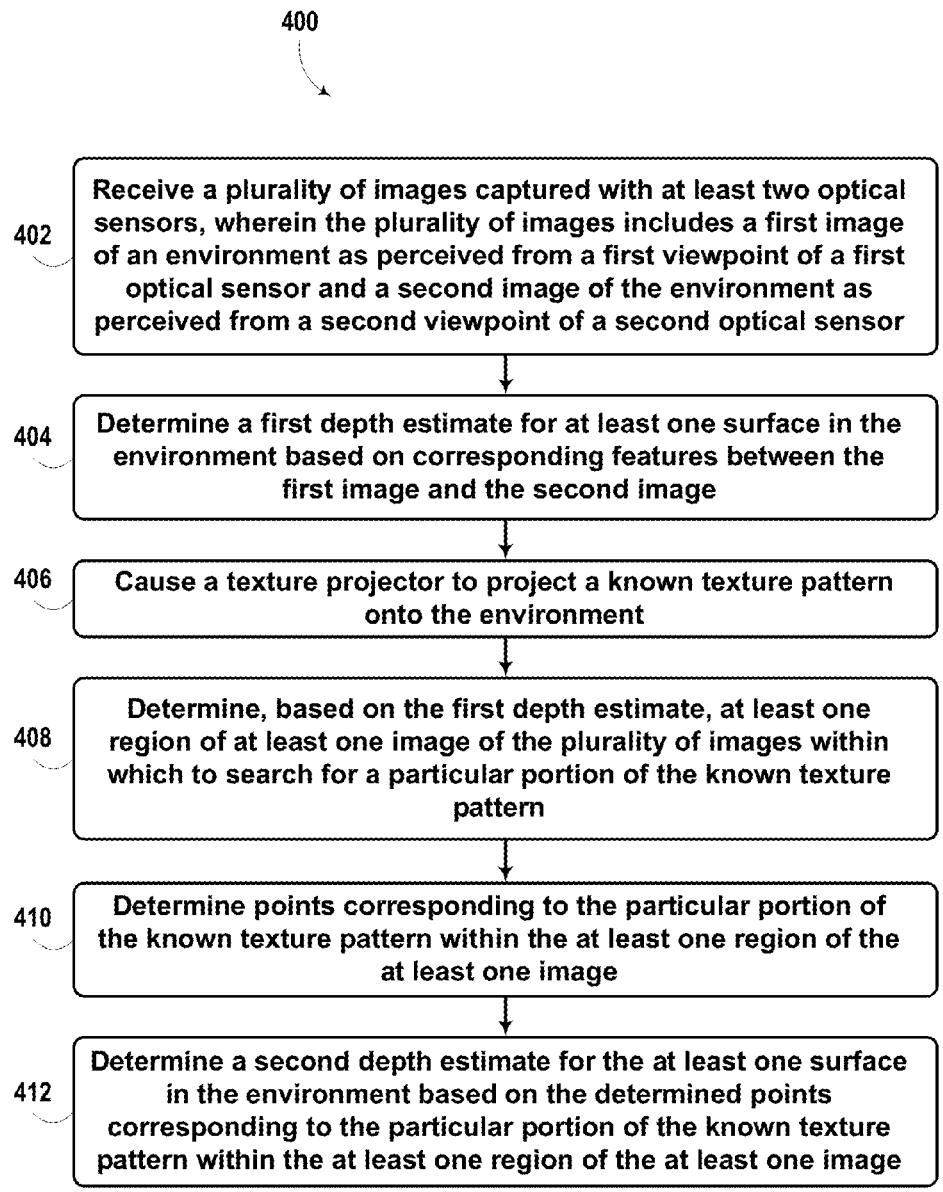
FIG. 4 is a block diagram of a method, according to an example embodiment.

Referring now to FIG. 4, FIG. 4 is a block diagram of an example method 400 for determining a virtual representation of an environment. Method 400 shown in FIG. 4 presents an embodiment of a method that could be used or implemented by the robotic device 200 of FIG. 2B, for example, or more generally by one or more components of any computing device. Method 400 may include one or more operations, functions, or actions as illustrated by one or more of blocks 402-412. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and random access memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device.

In addition, for the method 400 and other processes and methods disclosed herein, each block in FIG. 4 may represent circuitry that is wired to perform the specific logical functions in the process.

In one embodiment, functions of the method 400 may be performed by a control system, such as the control system 240 of FIG. 2B. In other embodiments, the functions of the method 400 may be distributed across multiple control systems that are configured to use an output of stereo image processing to restrict a search space for structured-light processing.

Initially, at block 402, the method 400 involves receiving a plurality of images captured with at least two optical sensors. The plurality of images may include a first image of an environment as perceived from a first viewpoint of a first optical sensor and a second image of the environment as perceived from a second viewpoint of a second optical sensor. Optionally, the plurality of images may include more than two images. For instance, the plurality of images may include one or more images captured by a third optical sensor. As another example, the plurality of images may include multiple images captured by the first optical sensor and multiple images captured by the second optical sensor.

The first optical sensor, second optical sensor, and third optical sensor may include any types of optical sensors, such as charge-coupled device (CCD) image sensors, complementary metal-oxide-semiconductor (CMOS) image sensors, or other types of sensors configured to convert an optical image into an electronic signal. By way of example, the first optical sensor, the second optical sensor, or the third optical sensor may be a red/green/blue (RGB) infrared (IR) camera. Additionally, the first optical sensor, the second optical sensor, or the third optical sensor may be a RGB camera. The RGB IR camera(s) or RGB camera(s) may be global shutter cameras, such that the pixels of a particular camera store information at the same time.

In some instances, one or any combination of the first optical sensor, second optical sensor, and third optical sensor may be coupled to a robotic manipulator, such as the robotic arm 202 of FIG. 2A.

At block 404, the method 400 involves determining a first depth estimate for at least one surface in the environment based on corresponding features between the first image and the second image. In one example, the computing device may use a block matching algorithm to determine corresponding features between the first image and the second image. Using the block matching algorithm, a segment of pixels of the first image (e.g., a 5×5, 11×11, or 21×21 window of pixels) may be matched against a range of segments of pixels in the second image to determine the closest matching segment of pixels in the second image. For example, the closest matching segment of pixels may be determined by minimizing a match function. Subsequently, given the pixel positions of a pair of corresponding features, one of various triangulation methods can be used to reconstruct the 3D position of the identified feature. According to the process of triangulation, the 3D position (x, y, z) of a point P can be reconstructed from the perspective projection of P on the image planes of a first sensor and a second sensor, given the relative position and orientation of the two sensors. Therefore, if the pixel positions of a pair of corresponding features are known, and the relative position and orientation of the two sensors is known, the 3D position of the feature can be determined.

In some examples, the computing device may determine the first depth estimate using a space-time stereo imaging. In space-time stereo imaging, rather than matching a single image captured with a first optical sensor to a single image captured with a second optical sensor, a first set of images (e.g., a first video stream) captured with a first optical sensor may be matched with a second set of images (e.g., a second video stream) captured with a second optical sensor. Utilizing both spatial and temporal appearance variation may help reduce ambiguity and increase accuracy.

At block 406, the method 400 involves causing a texture projector to project a known texture pattern onto the environment. By way of example, the computing device may cause the texture projector to project a known pattern of pixels (e.g., grids, dots, stripes, spots, horizontal bars, vertical bars, etc.) onto an environment. In one instance, the texture projector may be an infrared light emitter or infrared projector. For instance, the texture projector may include a light source, projection optics, and a liquid crystal display (LCD) or other method of interrupting light with a pattern. In another instance, the known pattern may be generated using a set of diffraction gratings.

In some examples, the known texture pattern may be projected onto the environment before the first image and the second image, described above with reference to block 402, are captured, such that the first image and second image used for stereo imaging include the known texture pattern. In other examples, the known texture pattern may be projected onto the environment after the first image and the second image are captured. For instance, stereo imaging may be performed using visual textures of the environment. Alternatively, prior to projecting the known texture pattern, the texture projector may project a random texture pattern onto the environment to facilitate the stereo imaging. In this scenario, after the first image and second image are captured, at least one optical sensor may capture at least one image that includes the known texture pattern.

In some embodiments, the texture projector may be coupled to a robotic manipulator, such as the robotic arm 202 of FIG. 2A.

At block 408, the method 400 involves determining, based on the first depth estimate, at least one region of at least one image of the plurality of images within which to search for a particular portion of the known texture pattern. As discussed above, the computing device may use the first depth estimate determined using stereo imaging to inform the pattern decoding process. In particular, for at least one image of the known texture pattern, the computing device may use the first depth estimate to determine a region of the at least one image within which to search for a particular portion of the known texture pattern.

In an example in which the texture projector and an optical sensor used to capture an image of the known texture pattern are aligned horizontally near the same height, the computing device may use the first depth estimate and a baseline distance between a position of the texture projector and a position of the optical sensor to predict where, within an image space of an image of the known texture pattern, a particular portion of the known texture pattern will be located. For instance, the computing device may use triangulation to determine a position within an image plane of the optical sensor where a particular portion of the known texture pattern is likely to be observed. And the computing device may then determine a region surrounding the position with the image plane as the search region for pattern decoding. If the texture projector and the optical sensor are not horizontally aligned at the same height, the computing device may determine a transformation that accounts for the misalignment.

In some embodiments, the image of the known texture pattern may be the first image or the second image described above with respect to block 402. In other words, the computing device may use the same image used for stereo matching to subsequently perform structured-light processing. In another embodiment, the computing device may use a different image than the first image or the second image to perform the structured-light processing. For instance, the plurality of images described above with respect to block 402 may include a third image of the known texture pattern captured using the first optical sensor, the second optical sensor, or a third optical sensor. In another instance, the plurality of images may include a third image and a fourth image captured using two different optical sensors (e.g., the first optical sensor and the second optical sensor).

In some examples, the size of the known texture pattern may be determined based on the first depth estimate and the size of the corresponding search region. For instance, the size of the projected texture pattern may be proportional to a level of error in the first depth estimate. In other words, if the first depth estimate includes a high level of error, the computing device may determine a large search region and cause the texture projector to project a texture pattern that is unique over a large area (e.g., 15×15 pixels). But if the first depth estimate includes a low level of error, the computing device may determine a smaller search region and cause the texture projector to project a texture pattern that is unique over a smaller area (e.g., 5×5 pixels). Thus, in some instances, the computing device may determine an expected size of the search region prior to causing the texture projector to project the known texture pattern, such that the computing device can cause the texture projector to project a known texture pattern with an appropriate size.

At block 410, the method 400 involves determining points corresponding to the particular portion of the known texture pattern within the at least one region of the at least one image. In line with the discussion above, the computing device may perform pattern decoding to identify points within the region (or multiple regions) that correspond to the particular portion of the known texture pattern. In some instances, the computing device may use a block matching algorithm to determine a block of pixels within the region having a closest match to the particular portion of the known pattern.

And at block 412, the method 400 involves determining a second depth estimate for the at least one surface in the environment based on the determined points corresponding to the particular portion of the known texture pattern within the at least one region of the at least one image. By way of example, the computing device may use a position of the texture projector, a position of an optical sensor used to capture the image, and the position of the corresponding points to triangulate a distance to the at least one surface in the environment.

In some instances, the computing device may repeat one or more blocks of the method 400 to determine multiple depth estimates for an environment. For example, the computing device may use the method 400 to determine a depth map that indicates the depth to one or more surfaces in the environment.

In a further example of the method 400, the computing device may determine a third depth estimate that combines information from the first depth estimate determined at block 404 and the second depth estimate determined at block 412. As one example, the third depth estimate may be determined by averaging the first depth estimate and the second depth estimate on a pixel-by-pixel or pixel-group-by-pixel-group basis. Other approaches for combining depth estimates are also possible, as one of ordinary skill in the art will appreciate.

Figure 5:
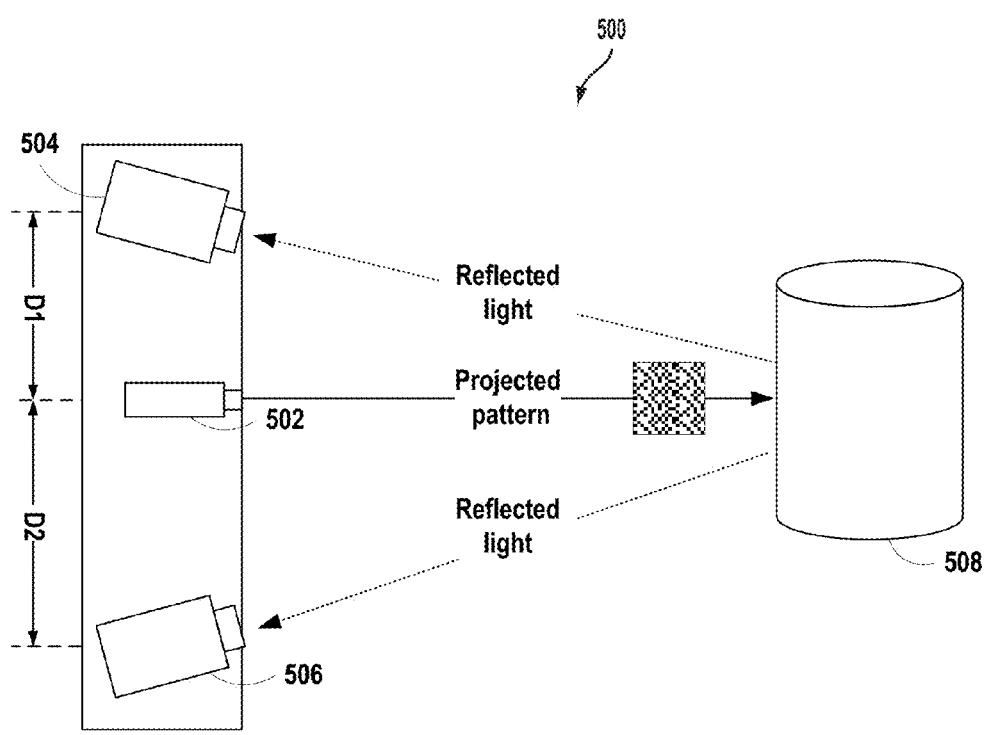
FIG. 5 is a conceptual illustration of an example imaging system.

Referring now to FIG. 5, FIG. 5 is a conceptual illustration of an example imaging system 500. As shown in FIG. 5, the imaging system 500 includes a texture projector 502, a first optical sensor 504, and a second optical sensor 506. The first optical sensor 504 is shown separated from the texture projector 502 by a first distance D1, and the second optical sensor 506 is shown separated from the texture projector 502 by a second distance D2 that is greater than the first distance D1. Therefore, in the arrangement of FIG. 5, the first optical sensor 504 and the second optical sensor 506 may observe the environment from different angles. In other examples, the first optical sensor 504 and the second optical sensor 506 may be separated from the texture projector 502 by the same distance (not shown).

In line with the discussion above, the first optical sensor 504 and second optical sensor 506 may be used to capture a first image from a first viewpoint and a second viewpoint. The first image and second image may be images of an object 508. In some instances, the first image and the second image may include images of a pattern projected onto the object 508 by the texture projector 502. However, in other instances, the first image and second image may be captured before the pattern is projected by the texture projector 502.

As described above, a computing device may use the first image and the second image to triangulate a distance to at least one surface of the object 508 based on a baseline distance between the first optical sensor 504 and the second optical sensor 506. As shown in FIG. 5, the first optical sensor 504 may be separated from the second optical sensor 506 by a distance D1+D2.

Further, the computing device may use a first depth estimate determined using the first image and the second image to facilitate structured-light processing. For instance, if the first image and the second image include the known texture pattern projected by the texture projector 502, the computing device may use the first image and/or the second image to triangulate a distance to a surface of the object 508, based on a baseline distance between the texture projector 502 and one or both of the first optical sensor 504 and second optical sensor 506. As one example, the computing device may determine, using the method 400 of FIG. 4, for example, corresponding points between a first image of the known texture pattern captured by the first optical sensor 504 and a particular portion of the known texture pattern. And based on the distance D1 between the first optical sensor 504 and the texture projector 502, the computing device may triangulate a distance to a surface of the object 508. Alternatively or additionally, the computing device may determine corresponding points between a second image of the known texture pattern captured by the second optical sensor 506 and a particular portion of the known texture pattern. And based on the distance D2 between the texture projector 502 and the second optical sensor 506, the computing device may triangulate a distance to a surface of the object 508.

In an example in which the computing device determines a first structured-light depth estimate using an image captured with the first optical sensor 504 and a second structured-light depth estimate using an image captured with the second optical sensor 506, the first structured-light depth estimate and the second structured-light depth estimate may be redundant depth estimates. Advantageously, the first structured-light depth estimate and the second structured-light depth estimate may vary since the distances D1 and D2 are different. In some instances, due to variations in an environment, a computing device may be unable to determine a structured-light depth estimate using an image captured with the first optical sensor 504 but may be able to determine a structured-light depth estimate using the second optical sensor 506. Thus, in some instances, it may be desirable to perform structured-light processing using two images.

As discussed above, rather than using the first image and the second image that were used for stereo matching, the computing device may instead use a third image of the known texture pattern captured with the first optical sensor 504 or the second optical sensor 506 to perform the structured-light processing.

Figure 6:
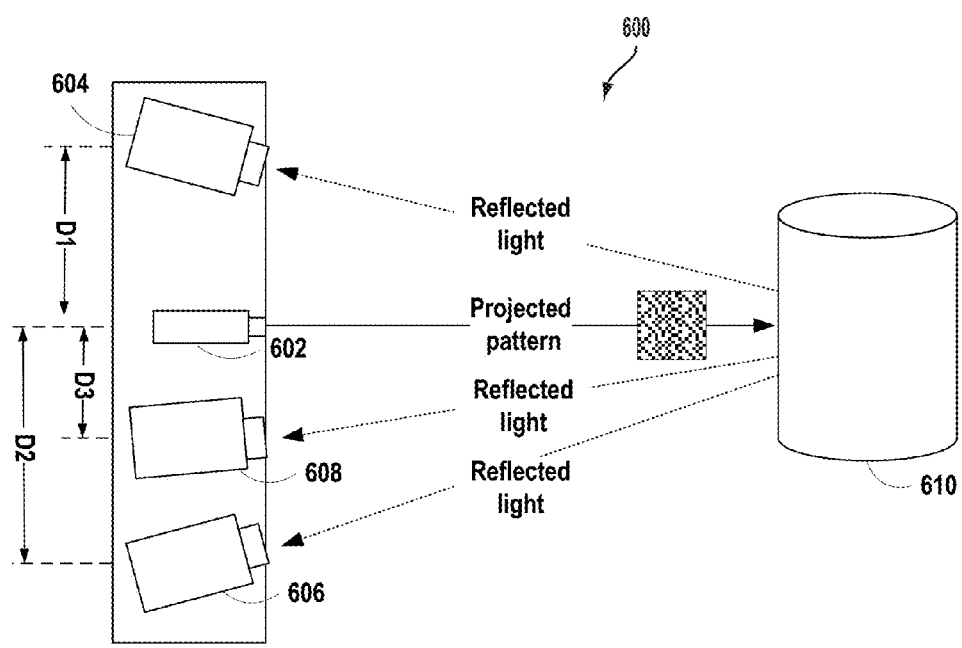
FIG. 6 is a conceptual illustration of another example imaging system.

Furthermore, in some instances, the computing device may use an image of the known texture pattern captured with a third optical sensor to perform the structured-light processing. FIG. 6 is a conceptual illustration of another example imaging system 600 that includes a texture projector 602, a first optical sensor 604, a second optical sensor 606, and a third optical sensor 608. In FIG. 6, the first optical sensor 604 is shown separated from the texture projector 602 by a distance D1, the second optical sensor 606 is shown separated from the texture projector 602 by a distance D2, and the third optical sensor 608 is shown separated from the texture projector 602 by a distance D3. In some instances, the arrangement shown in FIG. 6 may enable a computing device to determine three different structured-light depth estimates using images captured with the first optical sensor 604, the second optical sensor 606, and the third optical sensor 608 respectively, since the distances between the texture projector 602 and the three optical sensors vary. For instance, one or more of the optical sensors may be configured to determine depth estimates for objects that are far away from the texture projector 602, and one or more of the optical sensors may be configured to determine depth estimates for objects that are closer to the texture projector 602.

In one example, a computing device may use images captured with the first optical sensor 604 and the second optical sensor 606 to perform stereo matching, and use an image captured with the third optical sensor 608 to perform structured-light processing. For instance, the first optical sensor 604 and the second optical sensor 606 may be RGB cameras configured to observe visual textures of an object 610. Meanwhile, the third optical sensor 608 may be an IR sensor configured to observe a known infrared pattern projected onto the object 610 by the texture projector 602.

Other configurations are also possible, and the example system 600 is not meant to be limiting. In some instances, the relative arrangement of the texture projector 602, first optical sensor 604, second optical second 606, and third optical sensor 608 with respect to one another may vary from the example arrangement depicted in FIG. 6. For instance, each of the first optical sensor 604, second optical sensor 606, and third optical sensor 608 may be located on a common side of the texture projector 602. In another instance, the third optical sensor 608 may be located further away from the texture projector 602 than the second optical sensor 606. In still another instance, one or both of the second optical sensor 606 and the third optical sensor 608 may be located above or below the texture projector 602.

Figure 7A:
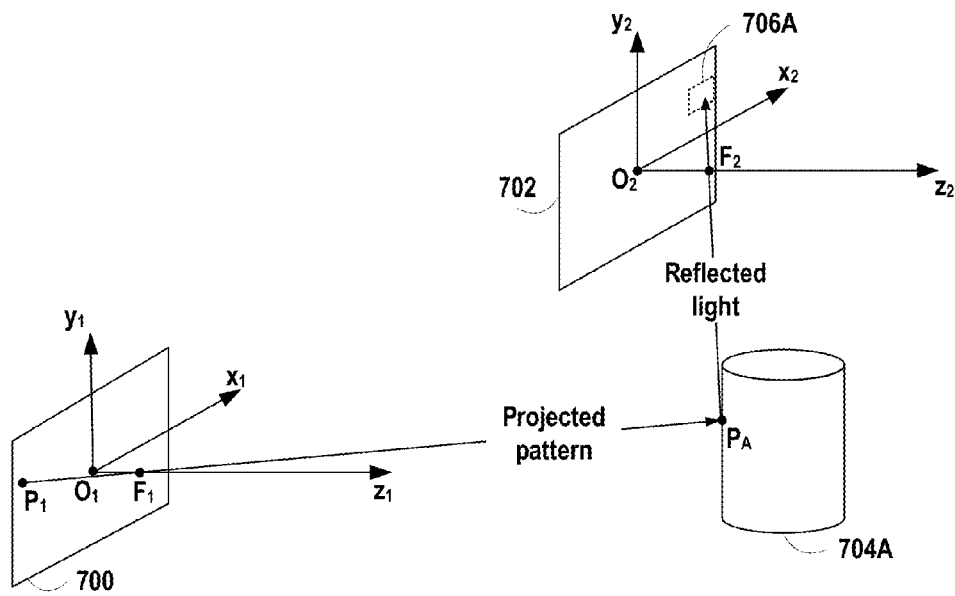
FIGS. 7A and 7B are conceptual illustrations of determining a region of an image within which to search for a particular portion of a known texture pattern.
Figure 7B:
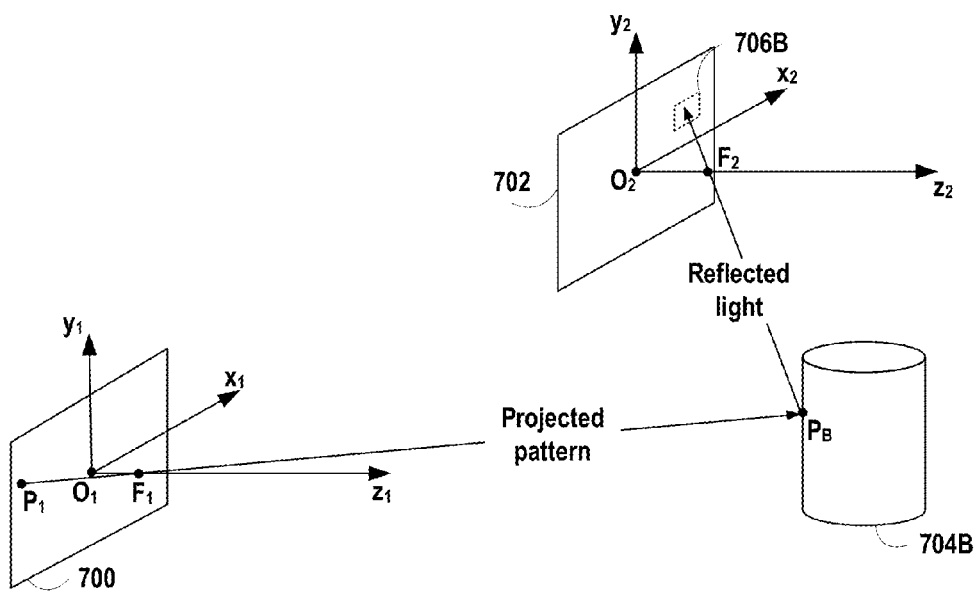

FIGS. 7A and 7B are conceptual illustrations of determining a region of an image within which to search for a particular portion of a known texture pattern. FIGS. 7A and 7B depict an illumination frame 700 and a captured frame 702 in an imaging system. The illumination frame 700 represents an image plane of a texture projector which projects a known texture pattern onto an environment. The illumination frame 700 includes an axis system with orthogonal axes, a focal point $F_1$, and an origin $O_1$. Similarly, the captured frame 702 represents an image plane of an optical sensor. The captured frame 702 includes an axis system with orthogonal axes, a focal point $F_2$, and an origin $O_2$. For simplicity, only a single captured frame 702 is depicted. Other examples may include multiple captured frames corresponding to multiple respective optical sensors.

As shown in FIG. 7A, the texture projector emits an example ray of structured-light from a position $P_1$ within the illumination frame 700. The example ray reflects off a point $P_A$ on a surface of an object 704A, and travels towards the captured frame 702. Since the depth of the point $P_A$ is known from a stereo depth estimate, and a distance between the focal points of the illumination frame 700 and captured frame 702 are known, a computing device may estimate, using triangulation, a region 706A where the ray of structured-light is likely to be captured. As shown in FIG. 7A, the region 706A may be a subset of the captured frame 702, and may be defined with respect to the orthogonal axes of the captured frame 702. The size of the region 706A relative to the size of the captured frame 702 is not meant to be limiting.

FIG. 7B depicts another example in which a texture projector emits a ray of structured-light from a position $P_1$ within the illumination frame 700. The example depicted in FIG. 7B differs from the example depicted in FIG. 7A since the ray reflects off a point $P_B$ of an object 704B that is located further away from the illumination frame 700. Consequently, a computing device may determine a region 706B that is located in a different portion of the captured frame 702 than the region 706A. In particular, the region 706B may be closer than region 706A to the origin of the captured frame 702.

Figure 8:
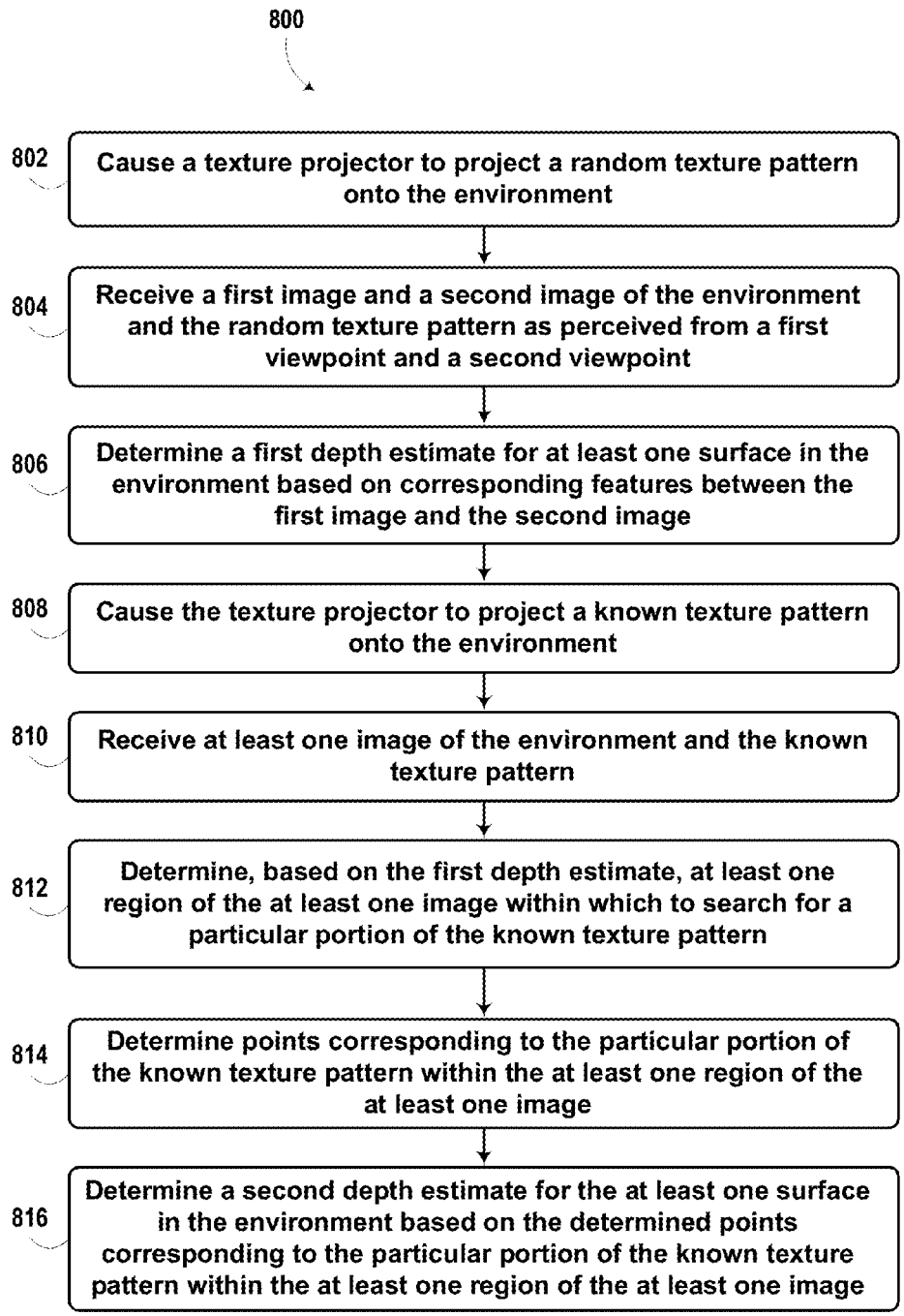
FIG. 8 is a block diagram of another method, according to an example embodiment.

FIG. 8 is a block diagram of another method 800, according to an example embodiment. Method 800 shown in FIG. 8 present an embodiment of a method that could be used or implemented by the control system 240 of FIG. 2B, for example, or more generally by one or more components of any computing device. Method 800 may include one or more operations, functions, or actions as illustrated by one or more of blocks 802-816. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 800, each block may represent a module, a segment, or a portion of program code, which includes one or more instructions executable by a processor or computing device for implementing specific logical functions or steps in a process. In addition, each block in FIG. 8 may represent circuitry that is wired to perform the specific logical functions in the process.

Initially, at block 802, the method 800 involves causing a texture projector to project a random texture pattern onto the environment. In some examples, the random texture pattern may be a pattern that facilitates stereo matching. For instance, the random texture pattern may be a random pattern of light, such as visible or infrared light, that is intentionally projected into a scene in order to construct easily identifiable features that can then be used to determine matching correspondences between two or more images. By way of example, the at least one random texture pattern may include a 2D pattern of spots or dots, where the spots or dots are uncorrelated in a random pattern. In various embodiments, the random texture pattern may be constant in time or may be varying as a function of time.

At block 804, the method 800 involves receiving a first image and a second image of the environment and the random texture pattern as perceived from a first viewpoint and a second viewpoint. At block 806, the method 800 then involves determining a first depth estimate for at least one surface in the environment based on corresponding features between the first image and the second image. In line with the discussion above, the computing device may use a block matching algorithm to find correspondences between the first image and the second image, and use triangulation to estimate a depth to one or more points in the environment.

At block 808, the method 800 involves causing the texture projector to project a known texture pattern onto the environment. In some instances, the texture projector may be the same texture projector used to project the random texture pattern at an earlier time. However, in other examples, two separate projectors may be used: a first projector that projects a random texture pattern at a first time, and a second texture projector that projects a known texture pattern at a second time.

At block 810, the method 800 involves receiving at least one image of the environment and the known texture pattern. For instance, the computing device may receive an image from the first optical sensor that was used to capture the first image and/or receive an image from the second optical sensor that was used to capture the second image. Or the computing device may receive a third image from a third optical sensor.

At block 812, the method 800 involves determining, based on the first depth estimate, at least one region of the at least one image within which to search for a particular portion of the known texture pattern. In line with the discussion above, the computing device may use the first depth estimate and a known relationship between the texture projector and the optical sensor used to capture an image to determine a part of an image within which to search for a particular portion of the known texture pattern.

At block 814, the method 800 involves determining points corresponding to the particular portion of the known texture pattern within the at least one region of the at least one image. And at block 816, the method 800 then involves determining a second depth estimate for the at least one surface in the environment based on the determined points corresponding to the particular portion of the known texture pattern within the at least one region of the at least one image.

Figure 9:
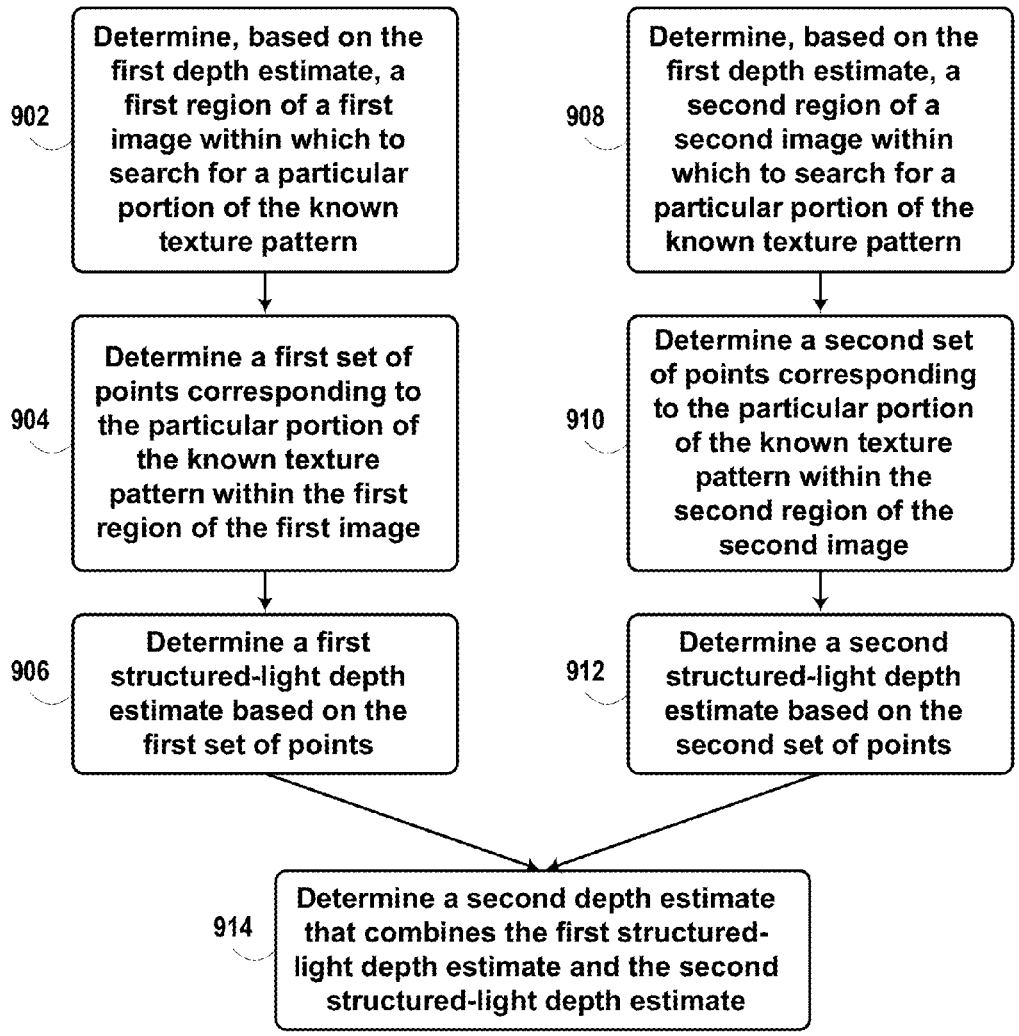
FIG. 9 is a block diagram of example functions that may be performed by a computing device, according to an example embodiment.

As mentioned briefly above, in some examples, a computing device may determine multiple structured-light estimates using images of a known texture pattern received from two different optical sensors. FIG. 9 is a block diagram of example functions that may be performed by a computing device, according to an example embodiment. In some examples, the example functions may be performed in conjunction with the example method 400 of FIG. 4 or the example method 800 of FIG. 8. For instance, the example functions of FIG. 9 may be performed in place of blocks 408-412 of Figure or blocks 812-816 of FIG. 8.

As shown in FIG. 9, the function at block 902 involves determining, based on the first depth estimate, a first region of a first image within which to search for a particular portion of the known texture pattern. For instance, based on a depth estimate determined using stereo imaging, the computing device may determine which part of the first image to search for a particular portion of the known texture pattern within. In some instances, the first image may be one of two images used to determine the first depth estimate. In other instances, the first image may be a different image than either of the images used to determine the first depth estimate. The functions at blocks 904 and 906 then involve determining a first set of points corresponding to the particular portion of the known texture pattern with the first image, and determining a first structured-light depth estimate based on the first set of points.

FIG. 9 also shows functions that may be performed with respect to a second image. In particular, the function at block 908 involves determining, based on the first depth estimate, a second region of a second image within which to search for a particular portion of the known texture pattern. For instance, based on a depth estimate determined using stereo imaging, the computing device may determine which part of the second image to search for a particular portion of the known texture pattern within. In some instances, the second image may be one of two images used to determine the first depth estimate. In other instances, the second image may be a different image than either of the images used to determine the first depth estimate. The functions at blocks 910 and 912 then involve determining a second set of points corresponding to the particular portion of the known texture pattern with the second image, and determining a second structured-light depth estimate based on the second set of points.

And the function at block 914 involves determining a second depth estimate that combines the first structured-light depth estimate and the second structured-light depth estimate. By way of example, the computing device may average the first structured-light depth estimate and the second structured-light depth estimate. Thus, the first structured-light depth estimate and the second structured-light depth estimate may be redundant depth estimates that may be combined to determine an accurate depth estimate.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described examples, it is intended that all matters in the preceding description and shown in the accompanying figures be interpreted as illustrative and not in a limiting sense. Further, it is intended to be understood that the following further describe aspects of the present description.

What is claimed is:

1. A method comprising:
    causing, by a computing device, a texture projector to project a known texture pattern onto an environment;
    receiving, by the computing device, a plurality of images captured with at least two optical sensors, wherein the plurality of images comprises a first image of the environment as perceived from a first viewpoint of a first optical sensor and a second image of the environment as perceived from a second viewpoint of a second optical sensor;
    determining, by the computing device, a first depth estimate for at least one surface in the environment based on corresponding features between the first image and the second image;
    determining, by the computing device and based on the first depth estimate, at least one region of at least one image of the plurality of images within which to search for a particular portion of the known texture pattern, wherein the at least one image is indicative of the environment and the known texture pattern projected onto the environment;
    determining, by the computing device, points corresponding to the particular portion of the known texture pattern within the at least one region of the at least one image; and
    determining, by the computing device, a second depth estimate for the at least one surface in the environment based on the determined points corresponding to the particular portion of the known texture pattern within the at least one region of the at least one image.

2. The method of claim 1, wherein determining, based on the first depth estimate, the at least one region of the at least one image within which to search for the particular portion of the known texture pattern comprises determining the at least one region using triangulation based on the first depth estimate and based on a position of the texture projector with respect to a position of an optical sensor used to capture the at least one image, wherein the optical sensor is the first optical sensor, the second optical sensor, or a third optical sensor.

3. The method of claim 1:
    wherein the at least one image comprises the first image, the second image, or both.

4. The method of claim 1, further comprising causing the texture projector to project a random texture pattern onto the environment such that the first image of the environment and the second image of the environment are indicative of the environment and the random texture pattern projected onto the environment.

5. The method of claim 4, wherein the at least one image comprises a third image of the plurality of images.

6. The method of claim 1, wherein the at least two optical sensors comprises the first optical sensor, the second optical sensor, and a third optical sensor and wherein the at least one image is captured with the third optical sensor.

7. The method of claim 1, further comprising determining a size of the known texture pattern based on a size of the at least one region of the at least one image.

8. The method of claim 1:
    wherein the first image of the environment and the second image of the environment are indicative of the environment and the known texture pattern projected onto the environment;
    wherein the at least one image comprises the first image and the second image;
    wherein the at least one region of the at least one image comprises a first region of the first image and a second region of the second image; and
    wherein determining points corresponding to the particular portion of the known texture pattern within the at least one region of the at least one image comprises: (1) determining a first set of points corresponding to the particular portion of the known texture pattern within the first region of the first image, and (2) determining a second set of points corresponding to the particular portion of the known texture pattern within the second region of the second image.

9. The method of claim 8, wherein determining the second depth estimate for the at least one surface in the environment comprises: (1) determining a first structured-light depth estimate based on the first set of points, (2) determining a second structured-light depth estimate based on the second set of points, and (3) determining a second depth estimate that combines the first structured-light depth estimate and the second structured-light depth estimate.

10. The method of claim 1, wherein the first optical sensor, the second optical sensor, and the texture projector are coupled to a robotic manipulator.

11. The method of claim 1, further comprising determining a third depth estimate by averaging the first depth estimate and the second depth estimate.

12. A non-transitory computer-readable medium having stored therein instructions, that when executed by one or more processors of a computing device, cause the computing device to perform functions comprising:
    causing a texture projector to project a known texture pattern onto an environment;
    receiving a plurality of images captured with at least two optical sensors, wherein the plurality of images comprises a first image of the environment as perceived from a first viewpoint of a first optical sensor and a second image of the environment as perceived from a second viewpoint of a second optical sensor;

determining a first depth estimate for at least one surface in the environment based on corresponding features between the first image and the second image;

determining, based on the first depth estimate, at least one region of at least one image of the plurality of images within which to search for a particular portion of the known texture pattern, wherein the at least one image is indicative of the environment and the known texture pattern projected onto the environment;

determining points corresponding to the particular portion of the known texture pattern within the at least one region of the at least one image; and determining a second depth estimate for the at least one surface in the environment based on the determined points corresponding to the particular portion of the known texture pattern within the at least one region of the at least one image.

13. The non-transitory computer-readable medium of claim 12, wherein determining, based on the first depth estimate, the at least one region of the at least one image within which to search for the particular portion of the known texture pattern comprises determining the at least one region using triangulation based on the first depth estimate and based on a position of the texture projector with respect to a position of an optical sensor used to capture the at least one image, wherein the optical sensor is the first optical sensor, the second optical sensor, or a third optical sensor.

14. The non-transitory computer-readable medium of claim 12:

wherein the at least one image comprises the first image, the second image, or both.

15. The non-transitory computer-readable medium of claim 12, wherein the functions further comprise determining a size of the known texture pattern based on a size of the at least one region of the at least one image.

16. A system comprising:

at least two optical sensors;

a texture projector configured to project a known texture pattern onto an environment; and a computing device configured to:

cause the texture projector to project a known texture pattern onto the environment, receive a plurality of images captured with the at least two optical sensors, wherein the plurality of images comprises a first image of the environment as perceived from a first viewpoint of a first optical sensor and a second image of the environment as perceived from a second viewpoint of a second optical sensor, determine a first depth estimate for at least one surface in the environment based on corresponding features between the first image and the second image, determine, based on the first depth estimate, at least one region of at least one image of the plurality of images within which to search for a particular portion of the known texture pattern, wherein the at least one image is indicative of the environment and the known texture pattern projected onto the environment, determine points corresponding to the particular portion of the known texture pattern within the at least one region of the at least one image, and determine a second depth estimate for the at least one surface in the environment based on the determined points corresponding to the particular portion of the known texture pattern within the at least one region of the at least one image.

17. The system of claim 16:

wherein the at least one image comprises the first image, the second image, or both.

18. The system of claim 16, further comprising a robotic manipulator, wherein the texture projector is coupled to the robotic manipulator.

19. The system of claim 18, wherein the at least two optical sensors are coupled to the robotic manipulator.

20. The system of claim 16, wherein the computing device is further configured to determine a size of the known texture pattern based on a size of the at least one region of the at least one image.

* * * * *